Patented May 24, 1927.

UNITED STATES PATENT OFFICE.

HUGH EDWARD HUGHES, OF BERKELEY, CALIFORNIA, ASSIGNOR, BY DIRECT AND MESNE ASSIGNMENTS, TO THE WEED CONTROL COMPANY OF CALIFORNIA, OF BERKELEY, CALIFORNIA, A CORPORATION OF CALIFORNIA.

WEED-DESTROYING COMPOSITION.

No Drawing. Application filed September 16, 1924. Serial No. 738,004.

My invention relates, in general, to the art of destroying undesirable vegetation, and in particular to chemical compositions for this purpose, especially those in which arsenic is employed as the toxic agent.

Successful weed eradication depends fundamentally upon penetration of the destructive agent, and practically, upon such leaf absorption of the agent as will produce root destruction.

In a chemical composition employing arsenic as the toxic agent, I have found by experience that I obtain better results with an acid solution of such agent, than with an alkaline or neutral solution. The composition should have also an ingredient such as will render it hygroscopic in order to provide ample time for leaf absorption. It should also have an oxidizing ingredient to keep the toxic agent in better solution for more perfect absorption.

A further desirability in practice is that the composition be capable of being produced economically and in compact or concentrated form, adapting it to be shipped to distant points, and there, by suitable dilution, do the work at a cost below the value obtained by its use.

These are the objects of my invention, the attainment of which together with the nature of my composition, will now be fully disclosed.

The ingredients of my composition in its complete form, are arsenic; an acid ingredient for dissolving the arsenic; an ingredient for rendering the composition hygroscopic; an oxidizing agent for better solution effect; and water. The arsenic may be in any suitable form, as, for example, oxide or chloride, the oxide being preferred. The acid solvent may also be of various nature, hydrochloric acid being preferred. The hygroscopic ingredient may be in several forms, such, for example, as sulfuric acid, manganese chloride, magnesium chloride, calcium chloride, or zinc chloride. Of these magnesium chloride is preferred.

The oxidizing agent may also be varied and may, for example, be saltpeter, potassium chlorate, potassium permanganate, potassium bichromate, or liquid chlorine. Of these, potassium permanganate is preferred.

In the preparation of the composition in its preferred and complete form, I give the following proportions, as an example, it being understood that these proportions may be varied as found best.

| | Parts. |
|---|---|
| Arsenious oxide | 9 |
| Hydrochloric acid | 28 |
| Magnesium chloride | 20 |
| Potassium permanganate | 5 |
| Water | 18 |

In preparing the composition, the arsenious oxide is first dissolved in the hydrochloric acid and the water and since from the above stated proportions there is an excess of hydrochloric acid, the mixture will be according to the following equation:

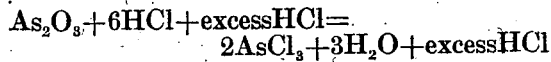

$As_2O_3 + 6HCl + excess HCl = 2AsCl_3 + 3H_2O + excess HCl$

To this solution the potassium permanganate is added according to the following equation:

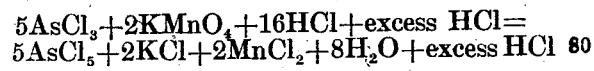

$5AsCl_3 + 2KMnO_4 + 16HCl + excess HCl = 5AsCl_5 + 2KCl + 2MnCl_2 + 8H_2O + excess HCl$ The magnesium chloride is then added and the mixture allowed to cool.

When this concentrate is finally diluted with the required amount of water in the field, it forms a mild, acidic, hygroscopic, corrosive, penetrating toxic composition, in perfect harmony with plant substance and plant circulation, and when sprinkled upon the leaves it remains moist giving ample time for absorption while effecting a gradual accumulation of the toxic agent in the roots.

I claim:

1. A weed destroying composition comprising an acidic aqueous solution of arsenic chloride.

2. A weed destroying composition comprising an acidic aqueous solution of arsenic chloride and a hygroscopic agent.

3. A weed destroying composition comprising arsenic chloride; water; hydrochloric acid; and a hygroscopic agent.

In testimony whereof I have signed my name to this specification.

HUGH EDWARD HUGHES.